United States Patent [19]

Shuttleworth

[11] Patent Number: 4,582,951
[45] Date of Patent: Apr. 15, 1986

[54] HOLDER ASSEMBLY FOR MOLTEN METAL IMMERSION DEVICES

[75] Inventor: William E. Shuttleworth, Ellwood City, Pa.

[73] Assignee: General Signal Corporation, Stamford, Conn.

[21] Appl. No.: 596,999

[22] Filed: Apr. 5, 1984

[51] Int. Cl.[4] ............................................. H01L 35/02
[52] U.S. Cl. ..................................... 136/234; 136/242
[58] Field of Search .......................... 136/230, 234, 242

[56] References Cited

U.S. PATENT DOCUMENTS

| | | | |
|---|---|---|---|
| 2,999,121 | 9/1961 | Mead | 136/234 |
| 3,298,874 | 1/1967 | Davies | 136/232 |
| 4,060,095 | 11/1977 | Kurita | 136/232 X |
| 4,093,193 | 6/1978 | Cassidy et al. | 266/87 |
| 4,135,538 | 1/1979 | Kurita | 136/234 |
| 4,185,982 | 1/1980 | Schwenninger | 136/213 X |
| 4,216,028 | 8/1980 | Kurita | 136/234 |
| 4,229,230 | 10/1980 | Hance | 136/234 |
| 4,296,921 | 10/1981 | Hayashi | 266/270 |
| 4,419,023 | 12/1983 | Hager, Jr. | 136/233 X |
| 4,468,009 | 8/1984 | Clauss et al. | 266/99 |

FOREIGN PATENT DOCUMENTS 956324 4/1964 United Kingdom .

Primary Examiner—Peter A. Nelson
Attorney, Agent, or Firm—Harold Huberfeld; William G. Miller, Jr.

[57] ABSTRACT

A device for immersion in a molten metal to determine a parameter of the molten metal including a parameter determining element and a first elongate section. The first elongate section is a replaceable section including a paper tube having a refractory coating on its outer surface. This replaceable section includes a first connector at one end thereof for detachably receiving the parameter determining element and for mechanically and electrically connecting the parameter determining element thereto. The replaceable section further includes a second connector at its other end with the second connector being electrically connected to the first connector. Also provided is a second elongate section having a third connector at one end for detachably receiving the second connector and for mechanically and electrically connecting the third connector to the second connector. The second elongate section further includes means at its other end for electrically connecting the third connector to an instrument designed to receive an output signal from the parameter determining element.

19 Claims, 8 Drawing Figures

HOLDER ASSEMBLY FOR MOLTEN METAL IMMERSION DEVICES

BACKGROUND OF THE INVENTION

The present invention relates generally to assemblies for the immersion of parameter determining devices into molten metal and more particularly, to a holder assembly having a section thereof which may be easily replaced if damaged.

During the refining of metal such as the refining of iron to steel and in the preparation of metals for casting, it is essential that certain parameters of the molten metal be accurately and swiftly determined. Some of these parameters are determined by immersing sensing devices into the molten metal that provide electrical signals that are indicative of the magnitude of the parameter. Such sensing devices are used to determine temperature by means of a thermocouple element, oxygen by means of an electrochemical cell, and carbon by means of temperature measurements made as an isolated sample cools through various thermal arrest temperatures. Other parameters of the molten metal require that a sample be removed from the bath of molten metal and be studied by chemical analysis or a metallographic analysis. Typical of such parameters are chemical composition and structure.

Parameter determining devices and particularly those to generate electrical signals while immersed in the molten metal are immersed in the molten metal by means of a holding assembly sometimes called a manipulator consisting of an iron pipe having electrical wires extending therethrough and terminating in an appropriate plug-in connector structure at its distal end. During immersion, it is essential that the manipulator be physically and thermally protected from the molten metal in order to prevent damage to or destruction of the manipulator. This protection has commonly been provided by a paper tube formed as an integral part of an expendable parameter detecting device. Depending on the length of the manipulator, such paper tubes range in length from two feet to eight feet and surround the lower end of the manipulator thereby providing a protective sleeve. The cost of the manipulator has been very high in comparison to the cost of the expendable parameter determining element and the paper protective sleeve. Therefore, the economics of such practices dictate that manipulators survive a large number of measurements before being damaged or destroyed.

However, because of the hostile environment in which such manipulators are used, they are very often inadvertently prematurely damaged or destroyed, usually in the region of the manipulator near the molten metal. In the past, such destroyed or damaged manipulators have either been replaced or repaired, if possible, either of which practices have been quite costly to the user.

SUMMARY OF THE INVENTION

Accordingly, a device is provided for immersion in a molten metal to determine a parameter of the molten metal. The immersion device includes a parameter determining element and a first elongate section with a first connector at one end thereof for detachably receiving the parameter determining element and for mechanically and electrically connecting the parameter determining element thereto. The first elongate section further includes a second connector at its other end with the second connector being electrically connected to the first connector. The immersion device further includes a second elongate section having a third connector at one end for detachably receiving the second connector and for mechanically and electrically connecting the third connector to the second connector. The second elongate section further includes means at its other end for electrically connecting the third connector to an instrument designed to receive an output signal from the parameter determining element.

Stated in other terms, the present invention includes a replaceable section of an immersion device for holding and immersing a parameter determining element in a molten metal. The replaceable section includes a paper tube having a refractory coating on its outer surface. A first connector is mounted within the tube at one end for mechanically and electrically connecting the replaceable section to the parameter determining element. A second connector is mounted within the tube at the other end and is electrically connected to the first connector and adapted to be mechanically and electrically connected to a permanent holding section of the immersion device.

OBJECTS OF THE INVENTION

It is, therefore, an object of the present invention to provide an immersion device for immersion of a parameter determining element in molten metal which may be repaired at considerably lower cost to the user than prior devices.

Another object of the present invention is the provision of an immersion device for immersion in a molten metal to determine the parameter of the molten metal which immersion device is lighter in weight and easier to manipulate than prior devices.

Other objects, advantages and novel features of the present invention will become apparent from the following detailed description of the invention when considered in conjunction with the accompanying drawings.

DESCRIPTION OF THE PREFERRED EMBODIMENT

With reference to FIGS. 1 through 5, the immersion device of the present invention will be described in detail.

Figure 1:
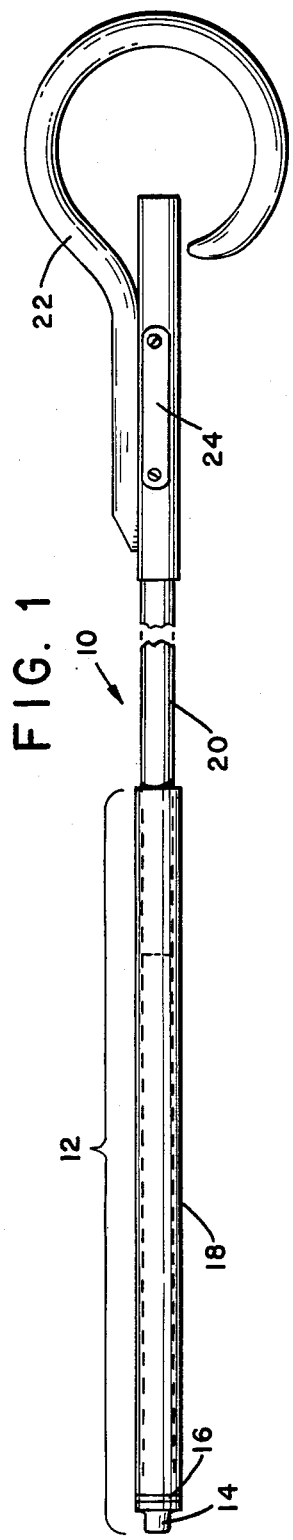
FIG. 1 is a side elevation of an immersion device of the present invention.

Referring now to FIG. 1, there is shown a manipulator 10 having mounted on its immersion end an expendable immersion device 12 consisting of a parameter determining element 14 secured typically by a cement 16 into the end of a heat-resistant paper tube 18. Extending well beyond the tube 18 is a permanent holding section 20 terminating typically in a handle 22. Additionally, an access means 24 is provided at the end of section 20 for electrically connecting the signal from parameter determining element 14 to a suitable instrument.

Figure 2:
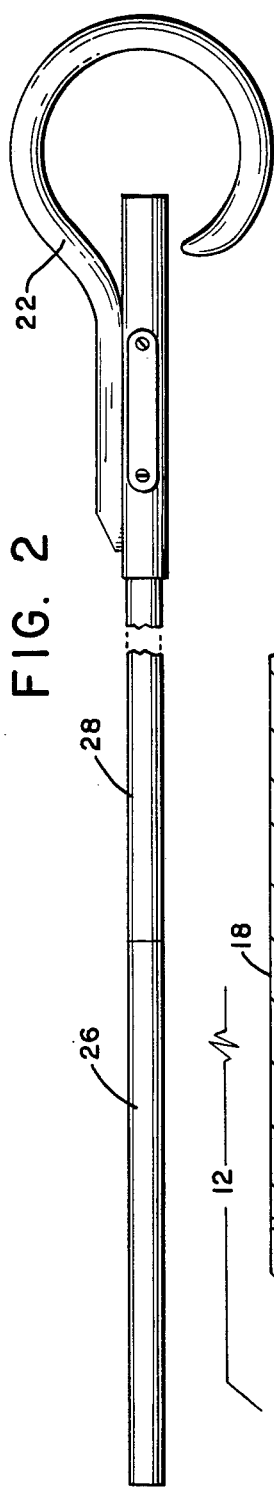
FIG. 2 is a side elevation of a sub-assembly of the immersion device of the present invention.

FIG. 2 shows the manipulator 10 prior to the installation of expendable immersion device 12. The manipulator 10 includes a first elongate section 26 and a second elongate section 28. In accordance with the principles of the present invention, the first elongate section 26 is a replaceable section that is designed at its distal end to detachably receive the parameter determining element 14 and to be surrounded by the protective tube 18. At its other end, the replaceable section 26 and the permanent section 28 are detachably engaged so that should section 26 become inadvertently damaged, it may be readily disengaged from the section 28 and replaced with a new section.

Figure 3:
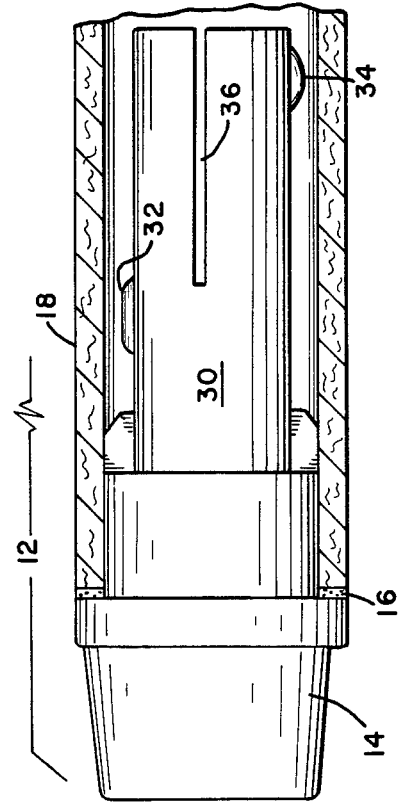
FIG. 3 is a side elevation in partial cross section of an expendable immersion device for use with the present invention.

FIG. 3 generally represents an expendable immersion device 12 having a parameter determining element 14 cemented by a suitable cement 16 into one end of a heat resistant tube 18. The parameter determining element 14 typically ends in a tail piece 30 including electrical contacts 32 and 34. It should be understood that the manipulator of the present invention is designed to be used with a wide variety of parameter determining elements, some of which have as many as four electrical output leads. However, a two-conductor tail piece has been shown for ease of illustration. The tailpiece 30 is generally made of a resilient material such as plastic. In order to provide further resiliency, the tail piece 30 which is usually a hollow cylindrical member also may include a slit 36 in one or both sides of the cylindrical wall.

Figure 4:
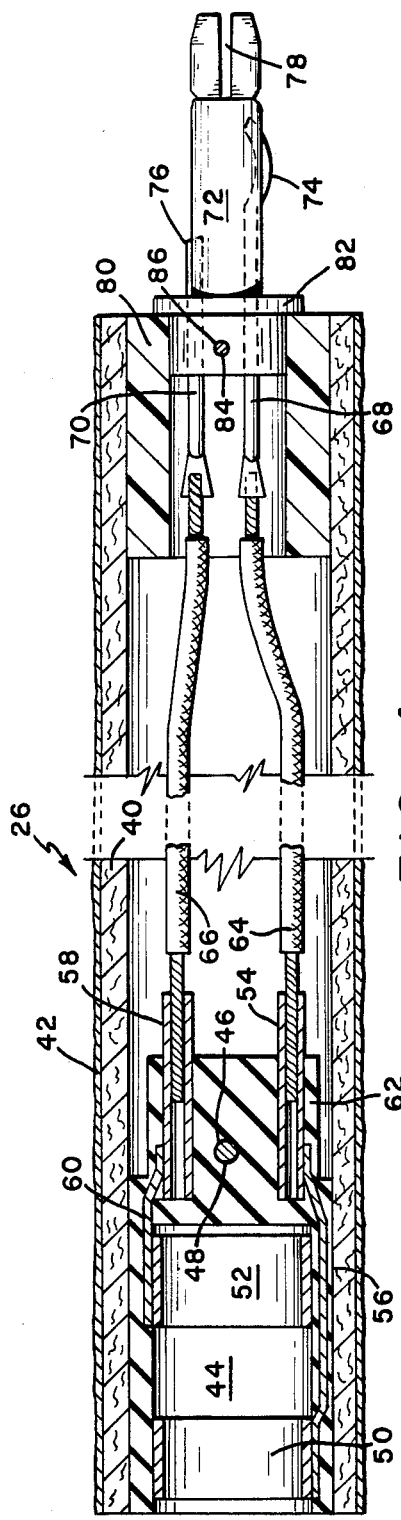
FIG. 4 is a side elevation in partial cross section of a replaceable section of the immersion device of the present invention.

Referring now to FIG. 4, replaceable section 26 will be described in detail. Replaceable section 26 includes a paper tube 40 coated with a refractory material 42. The refractory coating is preferably a slurry of graphite powder and sodium silicate and may be applied to the outer surface of the tube 40 with a suitable brush, for example, a paint brush. Although the thickness of the coating 42 is not believed to be critical, a thickness of approximately 0.03 inches has been found to be effective in providing the desired amount of thermal protection for tube 40 without unduly adding to the weight of section 26. An electrical receptacle 44 is inserted in a force-fitting engagement in the end of the paper tube 40 designed to be inserted into a molten metal bath. The receptacle 44 is further secured to the tube 40 by a pin 46 extending on both ends through the outer wall of the tube 40 and through a hole 48 in the end portion of receptacle 44. The receptacle 44 is designed to mate with the resilient tail piece 30 of parameter determining element 14. Accordingly, connector 44 includes two annular contacts 50 and 52 designed to engage contacts 32 and 34, respectively, of tail piece 30. Thus, it is apparent that when tube 18 of expendable immersion device 12 is placed over the end of tube 40 until tail piece 30 engages receptacle 44 that the expendable immersion device 12 will be both mechanically and electrically connected to the replaceable section 26.

Annular contact 50 is connected to a terminal pin 54 by a conductor 56. Likewise, annular contact 52 is connected to a terminal pin 58 by a conductor 60. All of the above conductor elements are preferably contained in a suitable molded rubber housing 62. Suitable flexible conductors 64 and 66 insulated everywhere but at their terminals are connected to terminal pins 54 and 58, respectively. Should the parameter determining element 14 include a thermocouple, as is usually the case, the electrical conductors 64 and 66 are made of materials that match the thermocouple leads, as is well known in the art.

Conductors 64 and 66 are in turn electrically connected to terminals 68 and 70 of a male connector 72. Male connector 72 preferably includes a resilient plastic body having contacts 74 and 76 protruding therefrom. In practice, contact 74 is integrally formed with terminal 68 and contact 76 is integrally formed with terminal 70. To further add to its resiliency, connector 72 may include a slit 78 on the end thereof. Connector 72 is mounted in a force-fitting engagement with the inner surface of a plastic bushing 80. The plastic bushing 80 is in turn mounted in a force-fitting fashion in the end of tube 40 designed to abut section 28. The connector 72 is inserted into the bushing 80 until its flange 82 abuts the end of the bushing. A hole 84 in the body of connector 72 is aligned with corresponding holes in the bushing 80 and the tube 40 so that a pin 86 may be inserted therein to further secure the connector 72 and the bushing 80 within the tube 40.

Figure 6:
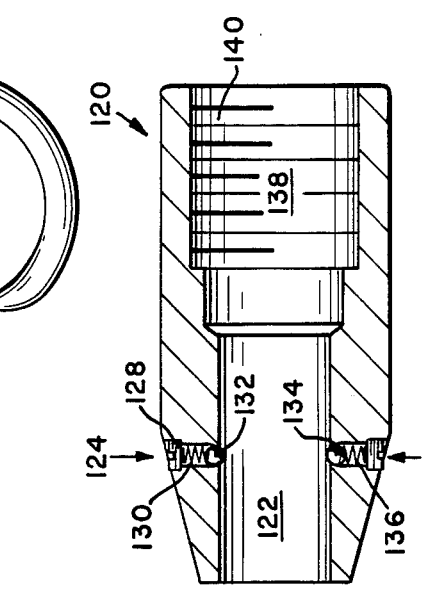
FIG. 6 shows a side elevation view in partial cross section of a mechanical connector used in a second embodiment of the immersion device of the present invention.
Figure 5:
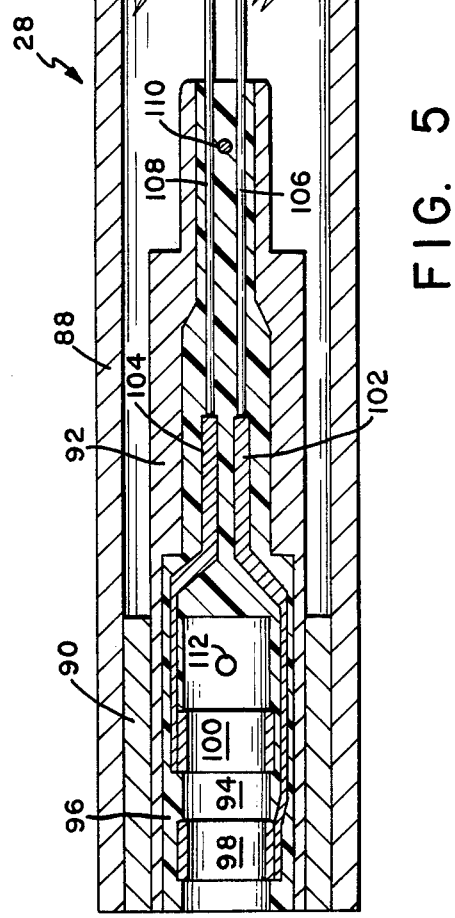
FIG. 5 is a side elevation in partial cross section of the permanent holding section of the immersion device of the present invention.

FIG. 5 shows some of the details of the permanent section 28 of the manipulator of the present invention. Section 28 is preferably made from a section of steel pipe 88. At the end of the pipe 88 adapted to abut replaceable section 26, a steel reducing bushing 90 is inserted in force-fitting engagement. In turn, the steel housing 92 of an electrical receptacle 94 is inserted in force-fitting engagement with the inner surface of the bushing 90. An insulating plastic liner 96 is contained with the housing 92 and retains a pair of electrical contacts 98 and 100 therein. The electrical contacts 98 and 100 are designed to mate with contacts 76 and 74, respectively, of connector 72. Thus, it is readily apparent that when connector 72 is inserted into receptacle 94, that the connector 72 will be both mechanically and electrically connected to the receptacle 94. To further add to the strength of the connection, the protective tube 18 normally extends well past the junction of sections 26 and 28. The contacts 98 and 100 are connected by suitable conductors 102 and 104, respectively, to insulated flexible electrical conductors 106 and 108, respectively. To further secure receptacle 94 within pipe 88, a pin 110 is inserted through holes aligned in housing 92 and pipe 88. In addition, to assure that the connection between connector 72 and receptacle 94 is mechanically stronger than the connection between tailpiece 30 and receptacle 44, a pair of spring loaded ball plungers 112 extend through the wall of conduit 88, bushing 90 and housing 92 to apply additional frictional engagement to connector 72. These ball plungers are merely a ball mounted in a threaded hole in spring loaded engagement with a set screw as described in greater detail in FIG. 6. The frictional engagement may be increased by tightening down on the set screw. In this manner, when tailpiece 30 is disconnected from receptacle 44, connector 72 will not also be disconnected from receptacle 94.

Conductors 106 and 108 extend the full length of section 28 and are provided with a suitable means 114 and 116, respectively, for connection to an instrument for receiving the output signal from the parameter determining element 14.

Replaceable section 26 will normally have approximately the same outside diameter as permanent section 28. Typically, this outside diameter would be approximate one inch. However, under certain circumstances, it may be desirable to connect a replaceable section 26 to a permanent section 28 wherein the outside diameter of the replaceable section 26 is smaller than the outside diameter of the permanent section 28. This problem is solved through the use of a mechanical connector 120 shown in FIG. 6. The mechanical connector 120 is adapted at end 122 for receiving the replaceable section 26. Spring loaded ball sockets 124 and 126 similar to the ball sockets 112 are utilized to maintain the section 26 in snug frictional engagement with end 122. Each ball plunger includes a set screw 128 compressing a spring 130 against a steel ball 132 retained within tapered end portion 134 of passage 136. The other end 138 of connector 120 includes a portion of increased inside diameter relative to end 122 having threads 140 cut therein. To mate with end 138 permanent section 28 will have to have corresponding threads cut in its outer wall at the end surrounding receptacle 94. Permanent section 28 may then be threadingly engaged within 138 of connector 120. It will be readily apparent that connector 72 of replaceable section 26 may be inserted into end 122 of connector 120 until it mates with receptacle 94 of section 28.

Figure 7:
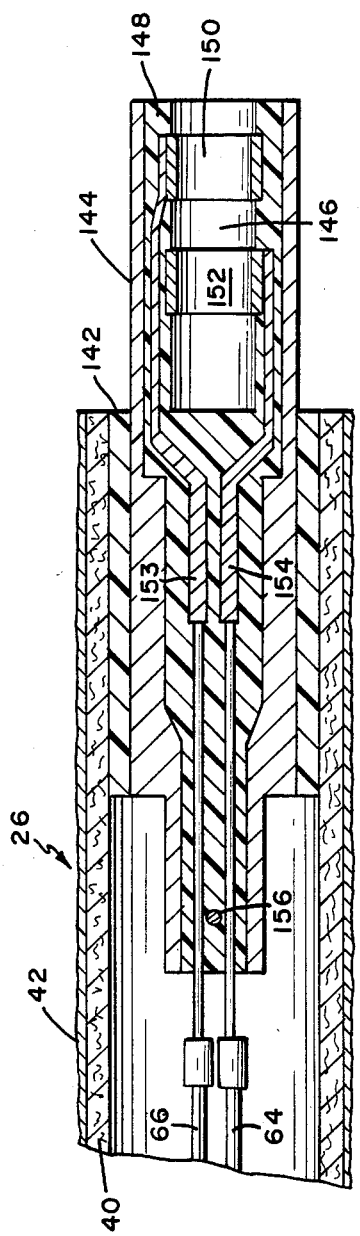
FIG. 7 is a side elevation in partial cross section of a second embodiment of the replaceable section of the immersion device of the present invention.
Figure 8:
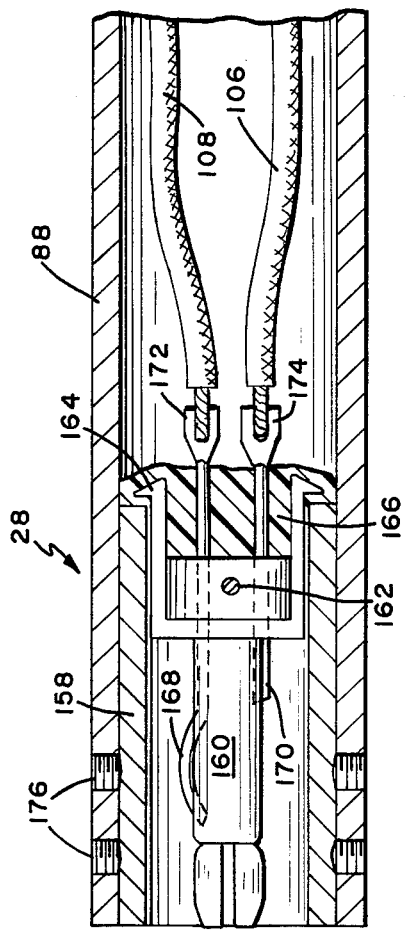
FIG. 8 is a side elevation in partial cross section of a second embodiment of the permanent holding section of the immersion device of the present invention.

FIGS. 7 and 8 show a second embodiment of the present invention wherein the male connector 72 in FIG. 4 is replaced with a receptacle and the receptacle 94 in FIG. 5 is replaced with a male connector. A plastic bushing 142 is mounted in a force-fitting fashion in the end of tube 40 designed to abut section 28. In turn, the steel housing 14 of an electrical receptacle 146 is inserted in force-fitting engagement with the inner surface of the bushing 142. An insulating plastic liner 148 is contained within the housing 144 and retains a pair of electrical contacts 150 and 152 therein. The contacts 150 and 152 are connected by suitable conductors 153 and 154, respectively, to the insulating flexible electrical conductors 66 and 64, respectively. Thus, the electrical receptacle 146 is electrically connected to the electrical receptacle 44. To further secure receptacle 146 within tube 40, a pin 156 is inserted through holes aligned in housing 144 and tube 40.

In section 28 at the end of the pipe 88 adapted to abut replaceable section 26, a steel reducing bushing 158 is inserted in force-fitting engagement. A male connector 160, similar in structure to male connector 72, is mounted within the bushing 158 and retained therein, in part, by a pin 162 inserted through holes aligned in connector 160, bushing 158 and pipe 88. Connector 160 also includes rearwardly protruding fingers 164 which are potted in a plastic epoxy compound 166 thereby further retaining connector 160 within bushing 58 and pipe 88. Connector 160 preferably includes a resilient plastic body having contacts 168 and 170 protruding therefrom. Contacts 168 and 170 are designed to mate with contacts 150 and 152, respectively, of receptacle 146. Thus, it is readily apparent that when connector 160 is inserted into receptacle 146 that the connector 160 will be both mechanically and electrically connected to the receptacle 146. In practice, contact 168 is integrally formed with terminal 172, and contact 170 is integrally formed with terminal 174. Terminals 172 and 174 are connected to conductors 108 and 106, respectively. Bushing 158 is further retained within pipe 88 by set screws 176. Thus, it is apparent that the primary difference between this embodiment and the embodiment disclosed in FIGS. 4 and 5 is that in this embodiment receptacle 146 protrudes beyond the end of tube 40 and male connector 160 is recessed within pipe 88. In the embodiment showed in FIGS. 4 and 5, male connector 72 protrudes beyond the end of tube 40 and receptacle 94 is retained within pipe 88.

Since the tube 40 is made of paper instead of steel, it considerably reduces the weight of the manipulator compared to prior all-steel manipulators. This benefit of weight reduction is amplified since it occurs at the distal end of the manipulator thus, further yielding a mechanical advantage making the manipulator much easier to handle. However, because of strength limitations, the tube 40 should not be more than five feet in length. When it is desired to replace the section 26 because of damage, the operator need merely grasp section 26 and 28 and disconnect connector 72 from receptacle 94. A new section 26 may then be readily inserted to abut the permanent section 28 resulting in a minimum amount of down time for the manipulator. Since the section 26 costs less than a complete manipulator assembly and since the amount of repair time is minimal, a significant cost-saving results from the use of the present invention.

Thus, it is apparent that an immersion device has been provided which may be repaired at considerably lower cost to the user than prior devices and which is both lighter in weight and easier to manipulate than prior devices.

While there has been described what is at present considered to be the preferred embodiment of the present invention, it will be obvious to those skilled in the art that various changes in modifications may be made therein, without departing from the invention, and it is, therefore, aimed in the appended claims to cover all such changes in modifications as followed in the true spirit and scope of the present invention.

What is claimed is:

1. A device for immersion in a molten metal to determine a parameter of said molten metal comprising:
   an expendable element for determining a parameter of said molten metal;
   a first elongate section having a first connector at one end thereof for detachably receiving said expendable element and for mechanically and electrically connecting said expendable element thereto, said first elongate section further including a second connector at the other end thereof, said second connector being electrically connected to said first connector; and
   a second elongate section having a third connector at one end thereof for detachably receiving said second connector and for mechanically and electrically connecting said third connector to said second connector, said second elongate section further having means at the other end thereof for electrically connecting said third connector to an instrument for receiving an output signal from said parameter determinig element.

2. An immersion device as set forth in claim 1 wherein said first elongate section is shorter than said second elongate section.

3. An immersion device as set forth in claim 2 wherein said first elongate section is less than five feet in length.

4. An immersion device as set forth in claim 1 wherein said first and second elongate sections are tubular.

5. An immersion device as set forth in claim 4 wherein said first elongate section comprises a paper tube having a refractory coating on the outer surface thereof.

6. An immersion device as set forth in claim 5 wherein said refractory coating is a slurry of graphite powder and sodium silicate.

7. An immersion device as set forth in claim 4 wherein said first connector is a receptacle engaging the inner surface of said tubular first elongate section in a force fitting fashion and further secured thereto by a pin extending into said tubular first elongate section through the outer wall thereof.

8. An immersion device as set forth in claim 4 wherein said second connector has a bushing engaging the inner surface of said tubular first elongate section in a force fitting fashion and a contact assembly in a force fitting engagement with the inner surface of said bushing, said contact assembly extending longitudinally beyond the end of said bushing and the tubular portion of said first elongate section, said contact assembly and said bushing being further secured to said tubular first elongate secion by a pin extending into said tubular first elongate section through the outer wall thereof.

9. An immersion device as set forth in claim 8 wherein said third connector is mounted in force fitting engagement with the inner surface of said tubular second elongate section.

10. An immersion device as set forth in claim 4 wherein said third connector further includes means extending through the wall of said second elongate section for retaining said second connector in mechanical and electrical engagement with said third connector.

11. An immersion device as set forth in claim 10 wherein said retaining means includes a pair of spring loaded ball plungers.

12. An immersion device as set forth in claim 4 further including a heat resistant tube affixed to said parameter determining element and surrounding said first elongate section.

13. An immersion device as set forth in claim 12 wherein said heat resistant tube also surrounds a portion of said second elongate section.

14. An immersion device as set forth in claim 13 wherein said heat resistant tube is made of paper.

15. An immersion device as set forth in claim 4 wherein the outside diameter of said tubular first elongate section is less than the outside diameter of said tubular second elongate section and wherein said immersion device further includes a mechanical connector for frictionally engaging said other end of said tubular first elongate section and for threadingly engaging said one end of said tubular second elongate section.

16. A replaceable section of an immersion device for holding and immersing an expendable element in a molten metal for determining a parameter of said molten metal comprising:
   a paper tube having a refractory coating on the outer surface thereof;
   first connector means mounted within said tube at one end thereof for mechanically and electrically connecting said replaceable section to said expendable element; and
   second connector means mounted within said tube at the other end thereof said second connector means being electrically connected to said first connector means and adapted to be mechanically and electrically connected to a permanent holding section of said immersion device.

17. A replaceable section of an immersion device as set forth in claim 16 wherein said refractory coating is a slurry of graphite powder and sodium silicate.

18. A replaceable section for an immersion device as set forth in claim 16 wherein said first connector is a receptacle engaging the inner surface of said tube in a force fitting fashion and further secured thereto by a pin extending into said tube through the outer wall thereof.

19. A replaceable section of an immersion device as set forth in claim 16 wherein said second connector has a bushing engaging the inner surface of said tube in a force fitting fashion and a contact assembly in a force fitting engagement with the inner surface of said bushing, said contact assembly extending longitudinally beyond the end of said bushing and the said other end of said tube, said contact assembly and said bushing being further secured to said tube by a pin extending into said tube through the outer wall thereof.

* * * * *